US006876645B1

(12) United States Patent
Guey et al.

(10) Patent No.: US 6,876,645 B1
(45) Date of Patent: Apr. 5, 2005

(54) DELAY AND CHANNEL ESTIMATION FOR MULTI-CARRIER CDMA SYSTEM

(75) Inventors: Jiann-Ching Guey, Apex, NC (US); Essam Sourour, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 752 days.

(21) Appl. No.: 09/610,050

(22) Filed: Jul. 5, 2000

(51) Int. Cl.$^7$ .............................................. H04B 7/216
(52) U.S. Cl. ...................................... 370/342; 370/441
(58) Field of Search ................................ 370/203, 208, 370/209, 320, 335, 342, 441, 479; 375/147, 148, 149, 150, 347, 367

(56) References Cited

U.S. PATENT DOCUMENTS

| | | | | |
|---|---|---|---|---|
| 5,481,570 A | * | 1/1996 | Winters | 375/347 |
| 5,533,062 A | * | 7/1996 | Liberti et al. | 375/334 |
| 5,870,378 A | * | 2/1999 | Huang et al. | 370/209 |
| 5,910,950 A | | 6/1999 | ten Brink | |
| 6,097,712 A | * | 8/2000 | Secord et al. | 370/335 |
| 6,335,922 B1 | * | 1/2002 | Tiedemann et al. | 370/335 |
| 6,507,602 B1 | * | 1/2003 | Dent | 375/142 |

FOREIGN PATENT DOCUMENTS

| | | |
|---|---|---|
| EP | 0 851 601 A2 | 7/1998 |
| EP | 1 168 743 A2 | 1/2002 |
| FR | 2 710 214 | 3/1995 |

OTHER PUBLICATIONS

Zhu et al., "Performance of MC-CDMA System Using Controlled MRC with Power Control in Rayleigh Fading Channel," Electronics Letters, Apr. 13, 2000, vol. 36, No. 8, 1 page.

International Search Report, PCT/US01/41274, Apr. 24, 2002.

* cited by examiner

*Primary Examiner*—Huy D. Vu
*Assistant Examiner*—Daniel Ryman
(74) *Attorney, Agent, or Firm*—Myers Bigel Sibley & Sajovec, P.A.

(57) ABSTRACT

A receiver for a multi-carrier CDMA system receives a signal transmitted having a known pilot sequence on plural sub-carriers. The system includes plural down-converters for down-converting the received signal to baseband signals. A delay and channel estimator correlates at least one of the baseband signals with a single wideband pilot signal, the single wideband pilot signal including all of the known pilot sequences, to produce an estimate of channel gain and multi-path delay. Plural demodulators, one for each of the plural sub carriers, are operatively coupled to the delay and channel estimator, each for demodulating one of the plural baseband signals using the estimate of channel gain and multi-path delay.

31 Claims, 6 Drawing Sheets

DELAY AND CHANNEL ESTIMATION FOR MULTI-CARRIER CDMA SYSTEM

BACKGROUND OF THE INVENTION

This invention relates to receivers for decoding signals received via multiple propagation paths having different propagation delays and, more particularly, to delay and channel estimation for multi-carrier systems.

Radio receivers are often used for decoding fading signals with the aid of estimates of the instantaneous propagation channel phase and amplitude characteristics. An exemplary application for such a radio receiver is a cellular phone for decoding signals transmitted by base stations using code division multiple access (CDMA) protocols.

A radio receiver, such as for a CDMA system, receives digitally coded and modulated signals from a transmitter. These signals include known, preselect signal patterns at known time intervals. Using known signal patterns, also referred to as pilot sequences, or pilot channel as commonly used in the CDMA literature, the receiver forms successive estimates of the delay and amplitude or complex value of propagation path characteristics between the transmitter and the receiver. These include estimates for multiple paths in the case of multi-path propagation.

In a typical CDMA system a signal is transmitted on a single carrier. However, this can limit data rate of transmission. More recently, a multi-carrier (MC) system is proposed in which the signal is transmitted using three sub-carriers. This effectively triples the data rate. However, the MC system requires that filtering, correlation and de-modulation be performed for each of the three sub-carriers.

The common approach for MC CDMA system delay and channel estimation is to use three baseband filters. The signal for the first sub-carrier is extracted using the first filter. A first correlator correlates the filtered signal using the known sequence. From this, the delay and complex gain can be determined. This process is repeated for the second and third sub-carriers.

In general, the signal transmitted by the k'th carrier is given by $$u_k(t) = [s_k(t) + o_k(t)]e^{j\Phi_k}, \quad (1)$$

where $s_k(t)$ is the known pilot signal of the k'th carrier, $o_k(t)$ is the sum of all other Walsh-orthogonal channels in the same carrier and $e^{j\Phi_k}$ is a constant phase term. Both $s_k(t)$ and $o_k(t)$ are baseband signals resulting from modulating data sequences on to streams of baseband pulse shape. The overall signal sent by the transmitter is $$g(t) = \sum_k u_k(t) e^{j2\pi(f_0+f_k)t} \quad (2)$$

where $f_0$ is the center carrier frequency and $f_k$ is the frequency separation of the k'th carrier with respect to the center carrier frequency. The frequency spacing $f_k$'s are assumed wide enough so that there is no spectrum aliasing between sub-carriers.

After propagating through a multi-path channel, the RF received signal can be expressed as $$\tilde{r}(t) = \sum_i \tilde{c}_i g(t-\tau_i) + \tilde{n}(t) \quad (3)$$

$$= \sum_i \tilde{c}_i \left[ \sum_k u_k(t-\tau_i) e^{j2\pi(f_0+f_k)(t-\tau_i)} \right] + \tilde{n}(t),$$

where $\tilde{c}_1$ is the complex channel gain of the multi-path, $\tau_1$ is its delay and $\tilde{n}(t)$ is the Additive White Gaussian Noise (AWGN) with power spectral density $N_0$.

SUMMARY OF THE INVENTION

In accordance with the invention a multi-carrier CDMA receiver identifies multi-paths and relative delays by considering the multi-carrier signal as an entire wide band signal and performs estimation using the known signals in all sub-carriers.

Particularly, the receiver receives a signal transmitted on plural sub-carriers and having a known pilot sequence. A plurality of down-converters down-convert the received signal to baseband signals. A delay and channel estimator correlates the baseband signals to produce an estimate of channel gain and multi-path delay. A plurality of demodulators, one for each of the plural sub-carriers, is coupled to the delay and channel estimator, each demodulating one of the baseband signals using the estimate of channel gain and multi-path delay.

DETAILED DESCRIPTION OF THE INVENTION

Figure 1:
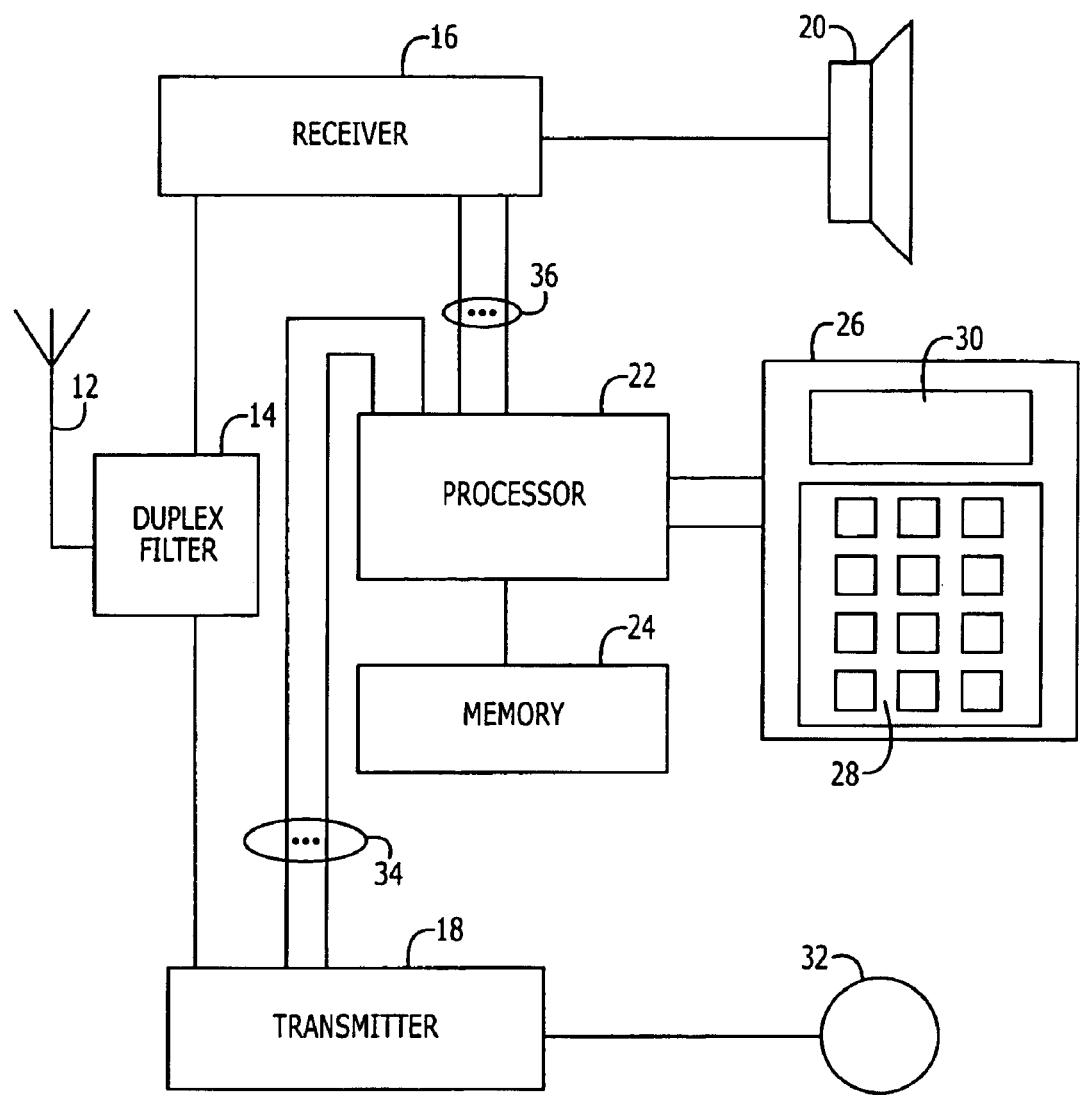
FIG. 1 is a block diagram of a mobile terminal including a receiver according to the invention.

FIG. 1 is a block diagram of a mobile terminal shown generally at 10. The mobile terminal 10 includes an antenna 12, a receiver 16, a transmitter 18, a speaker 20, a processor 22, a memory 24 a user interface 26 and a microphone 32. The antenna 12 is configured to send and receive radio signals between the mobile terminal 10 and a wireless network (not shown). The antenna 12 is connected to a duplex filter 14 which enables the receiver 16 and the transmitter 18 to receive and broadcast (respectively) on the same antenna 12. The receiver 16 demodulates, demultiplexes and decodes the radio signals into one or more channels Such channels include a control channel and a traffic channel for speech or data. The speech or data are delivered to the speaker 20 (or other output device, such as a modem or fax connector).

The receiver 16 delivers messages from the control channel to the processor 22. The processor 22 controls and coordinates the functioning of the mobile terminal 10 responsive to messages on the control channel using programs and data stored in the memory 24, so that the mobile terminal 10 can operate within the wireless network. The processor 22 also controls the operation of the mobile terminal 10 responsive to input from the user interface 26. The user interface 26 includes a keypad 28 as a user-input device and a display 30 to give the user information. Other devices are frequently included in the user interface 26, such as lights and special purpose buttons. The processor 22 controls the operations of the transmitter 18 and the receiver 16 over control lines 34 and 36, respectively, responsive to control messages and user input.

The microphone 32 (or other data input device) receives speech signal input and converts the input into analog electrical signals. The analog electrical signals are delivered to the transmitter 18. The transmitter 18 converts the analog electrical signals into digital data, encodes the data with error detection and correction information and multiplexes this data with control messages from the processor 22. The transmitter 18 modulates this combined data stream and broadcasts the resultant radio signals to the wireless network through the duplex filter 14 and the antenna 12.

The mobile terminal 10 may be used in a multi-carrier (MC), code division multiple access (CDMA) system in which the signal is transmitted using plural, such as, for example, three sub-carriers. Particularly, the receiver 16, in conjunction with the processor 22 utilizes the multi-carrier signal as an entire wideband signal and performs channel estimation using the known pilot signals in all sub-carriers.

Figure 2:
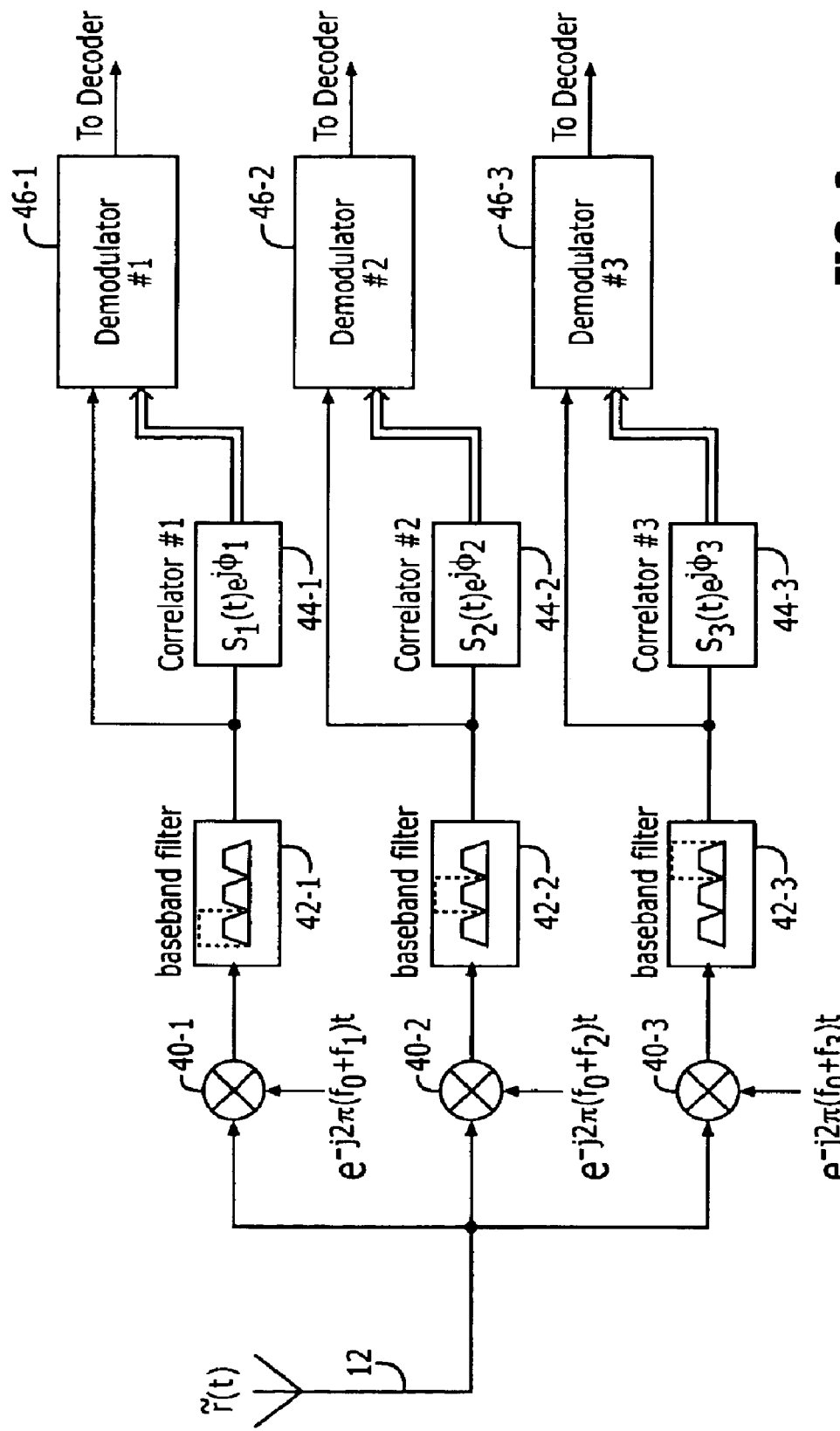
FIG. 2 is a block diagram of a prior art receiver.

The conventional approach for multi-carrier CDMA system delay and channel estimation is solved using the single-carrier method, as discussed above. FIG. 2 is a block diagram of such a conventional system. Equivalently, for the i'th sub-carrier the RF signal received on the antenna 12 is first down-converted to baseband by multiplying it with $e^{-j2\pi(f_0+f_i)t}$ using multipliers 40-i. For simplicity hereinafter, elements common to each sub-carrier are labeled in the drawings with a suffix –i, where i=1,2 or 3, corresponding to the respective carrier, but referred to herein with the suffix omitted. The output of each multiplier 40 is filtered using a baseband filter 42 to remove the other sub-carriers. Then delay and channel estimation are performed independently on each sub-carrier using the single-carrier method with correlators 44. The correlators 44 estimate the channel gain and multi-path delay. This information, along with the filtered signal, is applied to demodulators 46. The demodulators 46 use the delay and channel estimates to demodulate the received signal for each sub-carrier in a conventional manner. Demodulated data is then sent to a decoder (not shown).

After down conversion, the resulting baseband signal for the i'th sub-carrier is $$r_i(t) = \tilde{r}(t)e^{-j2\pi(f_0+f_i)t} \qquad (4)$$

$$= \sum_i \tilde{c}_i e^{-j2\pi f_0 \tau_i} e^{-j2\pi f_i \tau_i} u_i(t-\tau_i) +$$

$$\sum_i \tilde{c}_i e^{-j2\pi f_0 \tau_i} \left[ \sum_{k=i} u_k(t-\tau_i) e^{j2\pi(f_k-f_i)t} e^{-j2\pi f_k \tau_i} \right] + n_i(t)$$

where $n_i(t)$ is the down-converted Additive White Gaussian Noise (AWGN). Estimation of $\tilde{c}_1$ and $\tau_1$ can be achieved by correlating the received signal $r_i(t)$ with a replica of the i'th known pilot signal with a hypothesized delay $\tau$. Since the pilot signal is a baseband signal, the correlation filters out the signals of other carriers, i.e., the second term in Eq. (4). Replacing $\tilde{c}_1 e^{-j2\pi f_0 \tau_1}$ with $c_1$ for simplification, the output of the correlation as a function of $\tau$ can then be expressed as $$\lambda_i(\tau) = \int r_i(t) s_i^*(t-\tau) e^{-j\phi_i} dt \qquad (5)$$

$$= \int \left\{ \sum_i c_i e^{-j2\pi f_i \tau_i} [s_i(t-\tau_i) + o_i(t-\tau_i)] e^{j\phi_i} + n_i(t) \right\} s_i^*(t-\tau) e^{-j\phi_i} dt$$

$$= \sum_i c_i e^{-j2\pi f_i \tau_i} [R_{s_i}(\tau-\tau_i) + R_{s_i,o_i}(\tau-\tau_i)] + n_i(\tau),$$

where $$R_{s_i}(\tau) = \int s_i(t) s_i^*(t-\tau) dt$$

is the auto-correlation function of $s_i(t)$, $$R_{s_i,o_i}(\tau) = \int o_i(t) s_i^*(t-\tau) dt$$

is the cross-correlation between $o_i(t)$ and $s_i(k)$ and $$n_i(\tau) = \int n_i(t) s_i^*(t-\tau) e^{-j\phi_i} dt$$

is the filtered noise.

By varying the value of $\tau$ within the observation period, the delay profile of the channel as a function of $\tau$ can be obtained. The delays with correlation output exceeding a certain threshold are identified as possible multi-path echos. The channel gain of the echo is simply its corresponding correlation output. In particular, the correlation output of the m'th echo is $$\lambda_i(\tau_m) = c_m e^{-j2\pi f_i \tau_m} [R_{s_i}(0) + R_{s_i,o_i}(0)] + \qquad (6)$$

$$\sum_{i \neq m} c_i e^{-j2\pi f_i \tau_i} [R_{s_i}(\tau_m-\tau_i) + R_{s_i,o_i}(\tau_m-\tau_i)] + n_i(\tau_m)$$

$$= c_m e^{-j2\pi f_i \tau_m} E_{s_i} + \chi_i(\tau_m) + n_i(\tau_m)$$

where $E_{s_i} = R_{s_i}(0) = \int |s_i(t)|^2 dt$ is the energy of the pilot signal and $$\chi_i(\tau_m) = \sum_{i \neq m} c_i e^{-j2\pi f_i \tau_i} [R_{s_i}(\tau_m-\tau_i) + R_{s_i,o_i}(\tau_m-\tau_i)] \qquad (7)$$

is the interference from other multi-paths. The cross-correlation term $R_{s_i,o_i}(0)$ is removed due to the orthogonality between users in the same sub-carrier. In a typical CDMA system, the multi-path interference can be approximated by AWGN. Therefore, the performance of the channel estimation depends on the Signal to Noise Ratio (SNR) between the pilot signal and the sum of the multi-path interference and AWGN. The performance of the delay estimation, on the other hand, depends on the main lobe of the auto-correlation $R_{s_i}(\tau)$ of the pilot signal. The auto-correlation function with narrower main lobe has higher time resolution and therefore better performance in delay estimation.

If the interference and noise terms in Eq. (6) are small, $$\lambda_i(\tau_m)/E_{s_i} \approx c_m e^{-j2\pi f_i \tau_m}, \qquad (8)$$

which gives the channel estimate of the m'th path in the i'th carrier. The effect of fading can then be reversed by multiplying the received signal with the complex conjugate of Eq. (8) and the coherent demodulation of the information bits in $o_i(t)$ can be achieved.

The first step of the system according to the present invention may be to down-convert the received signal in Eq. (3) to baseband (with respect to $f_0$) by multiplying it with $e^{-j2\pi f_0 \tau}$. The resulting baseband signal is $$r(t) = \tilde{r}(t) e^{-j2\pi f_0 t} \qquad (9)$$

$$= \sum_i c_i \left[ \sum_k u_k(t - \tau_i) e^{j2\pi f_k(t-\tau_i)} \right] + n(t)$$

From Eq. (9) it is clear that to fully utilize the entire wideband signal, the known signal to correlate the receive signal $\tau(t)$ with should be $$\sum_k s_k^*(t-\tau) e^{-j2\pi f_k(t-\tau)} e^{-j\phi_k}. \qquad (10)$$

Thus, the correlation output as a function of $\tau$ is $$\lambda(\tau) = \int r(t) \left[ \sum_k s_k^*(t-\tau) e^{-j2\pi f_k(t-\tau)} e^{-j\phi_k} \right] dt \qquad (11)$$

$$= \sum_k e^{j2\pi f_k \tau} \int [r(t) e^{-j2\pi f_k t} s_k^*(t-\tau) e^{-j\phi_k}] dt$$

$$= \sum_k e^{j2\pi f_k \tau} \int r_k(t) s_k^*(t-\tau) e^{-j\phi_k} dt$$

$$= \sum_k e^{j2\pi f_k \tau} \lambda_k(\tau).$$

Substituting Eq. (5) in Eq. (11) gives $$\lambda(\tau) = \sum_k e^{j2\pi f_k \tau} \left\{ \sum_l c_l e^{-j2\pi f_k \tau_l} [R_{s_k}(\tau - \tau_l) + R_{s_k,o_k}(\tau - \tau_l)] + n_k(\tau) \right\} \qquad (12)$$

$$= \sum_l c_l \sum_k \{ e^{j2\pi f_k(\tau - \tau_l)} [R_{s_k}(\tau - \tau_l) + R_{s_k,o_k}(\tau - \tau_l)] \} +$$

$$\sum_k e^{j2\pi f_k \tau} n_k(\tau).$$

Comparing Eq. (12) with its single carrier counterpart in Eq. (5), it can be noted that the auto-correlation function dictating the estimation performance is now $$R_s(\tau) = \sum_k e^{j2\pi f_k \tau} R_{s_k}(\tau). \qquad (13)$$

Similarly, the correlation output of the m'th echo is $$\lambda(\tau_m) = c_m \sum_k E_{s_k} + \sum_k e^{j2\pi f_k \tau_m} [\chi_k(\tau_m) + n_k(\tau_m)]. \qquad (14)$$

It is clear from Eq. (14) that if there are K sub-carriers in the system and all sub-carriers have the same power, the disclosed approach has a 10 log(K) dB SNR gain over the conventional approach discussed above relative to FIG. 2. Furthermore, the accuracy of the delay estimation depends on the new composite auto-correlation function given in Eq. (13), which has a main lobe that is 1/K of that of a single carrier since the composite pilot signal has K times the bandwidth of the single carrier (A W. Rihaczek, "Principles of High-Resolution Radar," Artech House Radar Library, 1996).

Figure 3:
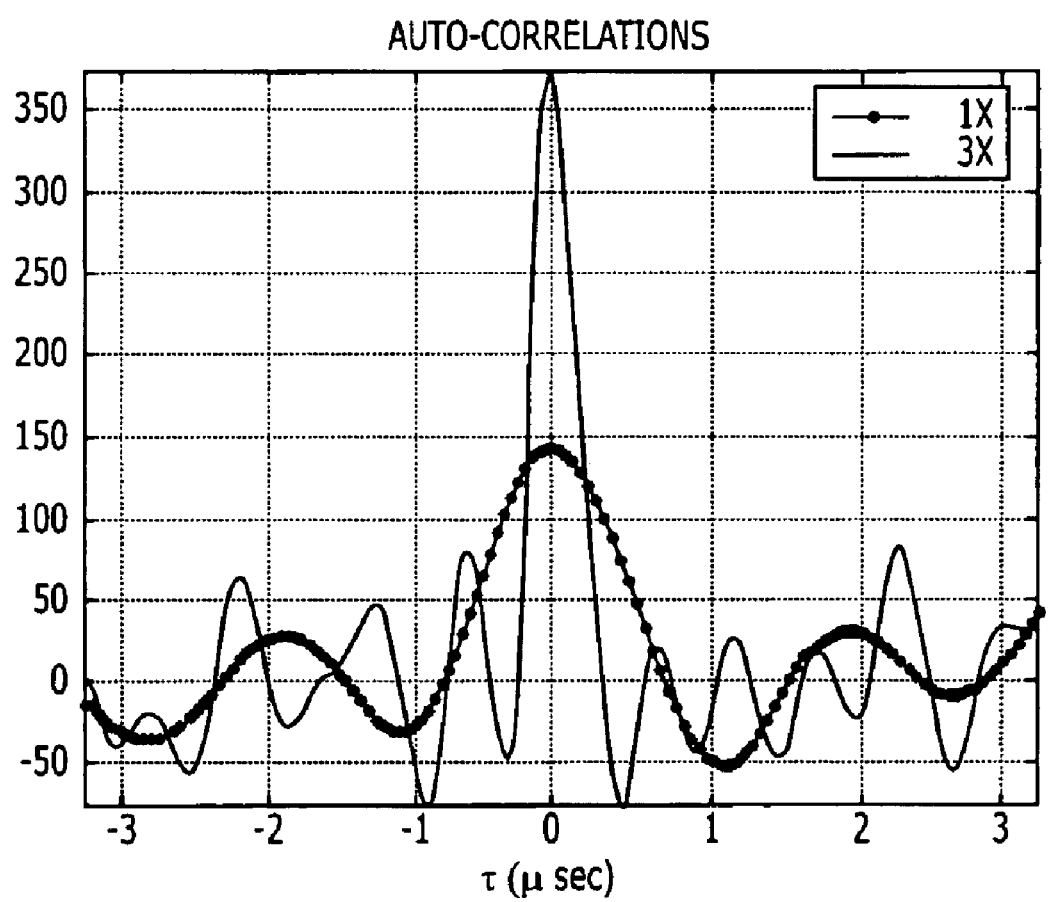
FIG. 3 is a curve illustrating auto correlation functions for the prior art receiver and a receiver according to the invention.

As an example, consider the pilot signal $$s_i(t) = \sum_n q_n^{(i)} p(t - nT_c), \qquad (15)$$

where $q_n^{(i)}$ is a random sequence of QPSK (quadrature phase-shift keying) symbols, p(t) is a band-limited pulse-shaping signal generally referred to as a chip, and $T_c$ is the chip interval. The pilot channels in the MC mode of IS-2000 (TIA/EIA/IS-2000.2[Ballot Version], "Physical Layer Standard for cdma2000 Spread Spectrum Systems," 1989) can be effectively modeled by Eq. (15) with $1/T_c$=1.2288 MHz and an approximate Nyquist pulse shaping function. There are a total of three sub-carriers separated by 1.25 MHz in the system. FIG. 3 shows the real part of the auto-correlation for one of the single carrier pilot signals (1×) and that of the multi-carrier composite pilot signal (3×). A section of 128 chip duration is extracted randomly as the pilot signal and the SNR defined as the ratio of the energy per chip per carrier over $N_0$ is set to −7 dB. The resolution improvement in delay estimate is apparent from the narrower peak width of the 3× function which is centered at zero delay, and SNR improvement for channel estimate is evident from the higher peak of the 3× function.

It is clear from Eq. (11), which is repeated here without the intermediate derivation steps, $$\lambda(\tau) = \sum_k e^{j2\pi f_k \tau} \lambda_k(\tau), \qquad (16)$$

that the correlation output according to the present invention can be obtained from the individual correlation outputs of the conventional approach of FIG. 2. In other words, a channel profile with higher resolution and stronger SNR can be synthesized from several of those with lower resolution and weaker SNR using Eq. (16).

The channel estimate derived from Eq. (16) at the delay $\tau_m$ is $c_m$. For the coherent demodulation of the i'th carrier, this coefficient needs to be rotated by a factor of $e^{-j2\pi f_i \tau_m}$. In cases where the coherent bandwidth of the fading channel is of the order of the bandwidth of a single carrier, the high resolution correlation output $\lambda(\tau)$ will likely see more than one path in a chip period while the individual correlation output $\lambda_i(\tau)$ will see only a blurred image of one single path resulting from the superposition of several closely separated paths. The channel coefficients as observed by each individual sub-carrier will therefore differ not only in phase, but also in amplitude. However, they can still be derived from Eq. (16) with appropriate interpolation if needed.

In cases where the coherent bandwidth of the channel is so small that the interpolation of the higher-resolution channel profile into the lower-resolution channel profiles does not improve the performance of the individual subcarriers or does not justify the computational complexity, a switch function can be implemented in the processor to decide whether to use the conventional approach or the disclosed approach based on the measurement of the channel's coherent bandwidth.

The disclosed approach according to the present invention identifies all of the pilot (known) signals in the sub-carriers as a single wideband pilot signal and correlates it against the entire multi-carrier received signal. The resulting correlation output outlines the profile of the multi-path channel with higher temporal resolution and stronger SNR.

There may be several embodiments of the system according to the present invention. A receiver architecture implementing the above general description is shown in block diagram form in FIG. 4. Where elements are similar to those shown in FIG. 2, like reference numerals are used. Initially, the received signal is converted to baseband with multipliers 40 and filtered using filters 42, as with the conventional approach of FIG. 2. The difference from the conventional approach is summarized in the following:

The RF signal is down-converted to baseband with respect to the center carrier frequency $f_0$ by multiplying the received signal with $e^{j2\pi f_0 t}$ using a composite multiplier 50:

$$r(t) = \tilde{r}(t) e^{-j2\pi f_0 t}. \quad (17)$$

The composite baseband signal is filtered with a filter 51 that passes all of the sub-carriers. Channel estimation and delay are determined by a correlator 52. The correlator 52 correlates the down-converted wideband signal with $s^*(t) = \Sigma_i s_i^* (t) e^{-j2\pi f_i t} e^{-j\phi_i}$ as follows:

$$\lambda(\tau) = \int r(t) s^*(t-\tau) dt \quad (18)$$

From $\lambda(\tau)$, a multi-path can be identified and its relative delay $\hat{\tau}_m$ estimated using a conventional technique such as threshold comparison. The channel coefficient estimate of this path is simply $$\hat{c}_m = \frac{\lambda(\hat{\tau}_m)}{\sum_k E_{s_k}} \quad (19)$$

Finally, $\hat{c}_m$ is rotated by $e^{-j2\pi f_i \hat{\tau}_m}$ to give the channel estimate for the i'th carrier at delay $\tau_m$. The channel delay and estimates, along with the sub-carrier baseband signals from the filters 42, are then supplied to the demodulators 46, as with the conventional approach.

Eq. (16) suggests an alternative embodiment of a receiver architecture illustrated in FIG. 5. It differs from the first embodiment of FIG. 4, only in the calculation of $\lambda(\tau)$.

As with the conventional approach, the alternative embodiment down-converts the RF signal of each individual sub-carrier to baseband with respect to its own center frequency by multiplying the received signal with $e^{-j2\pi (f_0+f_i)t}$ above using multipliers 40, as follows:

$$r_i(t) = \tilde{r}(t) e^{-j2\pi (f_0+f_i)t}. \quad (20)$$

The signals are then filtered with filters 42 to provide the sub-carrier baseband signals. For the i'th sub-carrier, a correlator 44 correlates the down-converted signal with $s_i^*(t) e^{-j\phi_i}$:

$$\lambda_i(\tau) = \int r_i(t) s_i^*(t-\tau) e^{-j\phi_i} dt. \quad (21)$$

In accordance with the present invention, the high resolution channel profile $\lambda(\tau)$ is synthesized by combining the individual correlation outputs. This is done by rotating the individual correlator outputs using multipliers 54. The signals are then summed and derotated at a block 56. This combination is expressed as $$\lambda(\tau) = \sum_i e^{j2\pi f_i \tau} \lambda_i(\tau). \quad (22)$$

From $\lambda(\tau)$, a multi-path can be identified and its relative delay $\hat{\tau}_m$ estimated using a conventional technique such as threshold comparison. The channel coefficient estimate of this path is simply $$\hat{c}_m = \frac{\lambda(\hat{\tau}_m)}{\sum_k E_{s_k}}. \quad (23)$$

Finally, $\hat{c}_m$ is derotated by $e^{-j2\pi f_i \hat{\tau}_m}$ in the block 56 to give the channel estimate for the i'th carrier at delay $\tau_m$.

Figure 4:
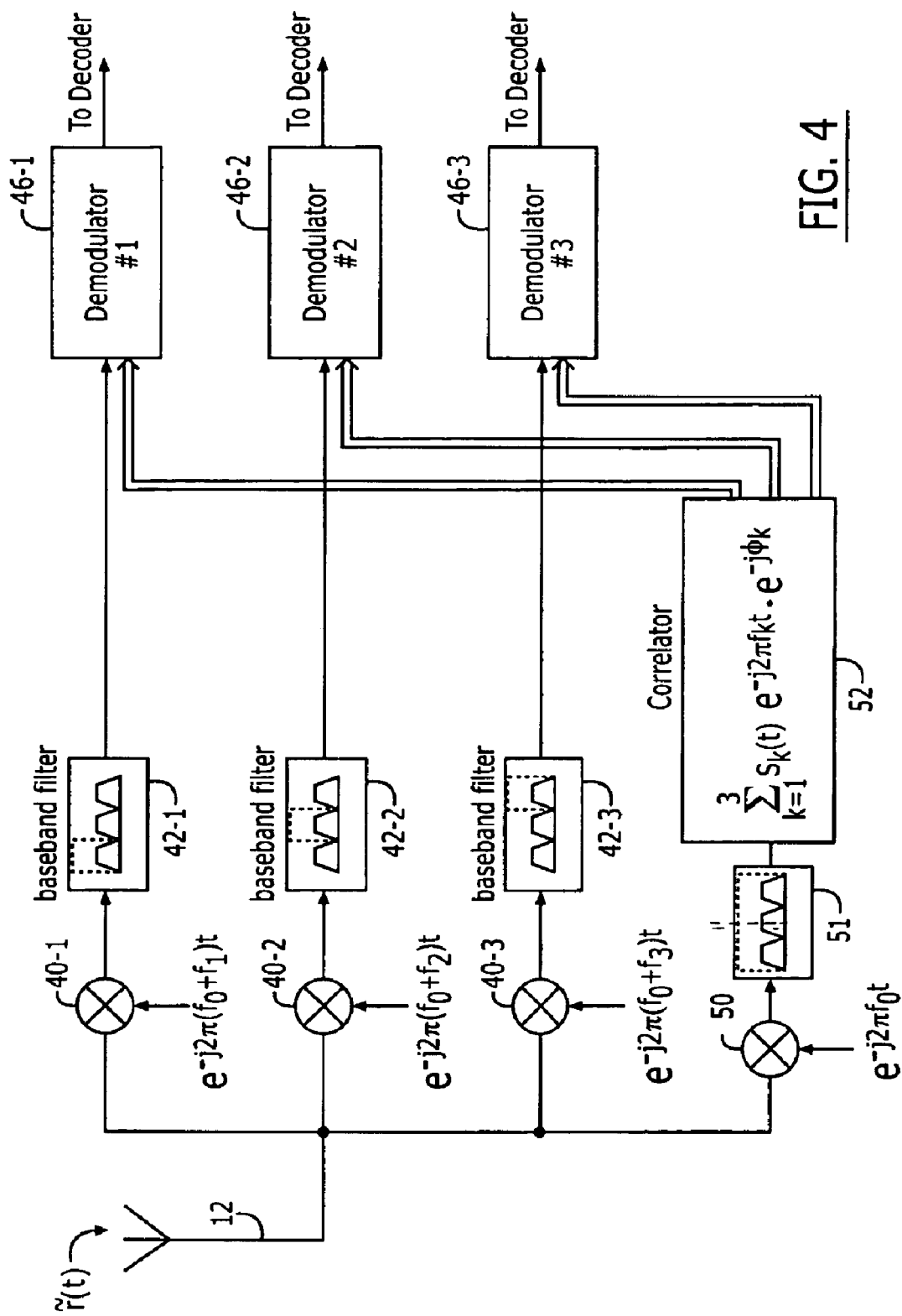
FIG. 4 is a block diagram of a receiver according to one illustrated embodiment of the invention.
Figure 5:
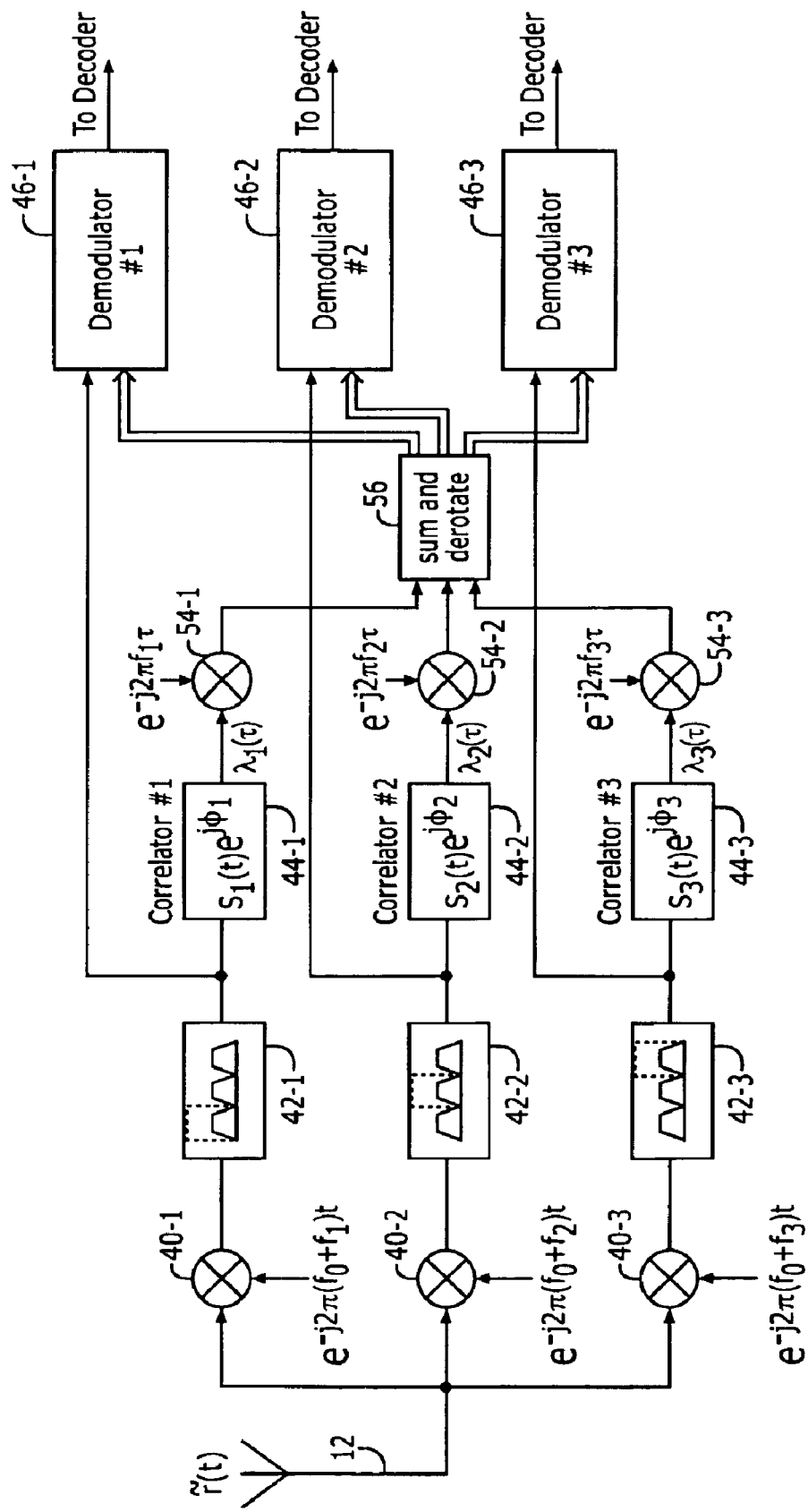
FIG. 5 is a block diagram of a receiver according to another illustrated embodiment of the invention.

As is conventional, the filter 42 is implemented in hardware in the receiver 16, see FIG. 1. The equations described herein, and represented by blocks in the block diagrams of FIGS. 4 and 5 are implemented in software by the processor 22. However, the invention is not limited to such a division of functionality. As such, where the term receiver is used herein, the term encompasses functions implemented in hardware in the receiver block 16 and in software in the processor block 22.

The embodiment of FIG. 4 uses all of the known signals in the subcarriers as a single wideband reference signal and correlates this reference signal against the entire multi-carrier received signal. The resulting correlation output yields the underlying channel profile with stronger SNR and higher temporal resolution. Furthermore, this higher resolution channel profile can be synthesized by combining the individual lower resolution profiles of the sub-carriers using equation (11).

While equation (11) is expressed in continuous time, the correlations are performed on discrete samples in practice. Therefore, if the individual correlation output $\lambda_k(\tau)$ is sampled every $\tau_s$ seconds, then a straightforward method for synthesizing and sampling $\lambda(\tau)$ is $$\lambda_k(n\tau_s) = \sum_k e^{j2\pi f_k n\tau_s} \lambda_k(n\tau_s) \quad (24)$$

which has the same sampling rate as the individual sampled correlation output $\lambda(n\tau_s)$.

In accordance with another aspect of the invention a receiver solves the problem of sampling and synthesizing the composite correlation output, or $\lambda(\tau)$ as expressed in mathematical term described above, required for improving channel estimation in a multi-carrier system. As will be described, the receiver can synthesize $\lambda(\tau)$ at any desired sampling rate if the sampling rate of the individual correlation outputs meets the Nyquist criterion.

Although very simple, equation (24) is not an optimal way of combining several time sequences from different frequency bands. In the frequency domain, the Fourier transform of $\lambda(\tau)$, denoted by $\Lambda(f)$, is simply $$\Lambda(f) \triangleq \int \lambda(\tau) e^{-j2\pi f \tau} d\tau = \sum_k \Lambda_k(f - f_k) \quad (25)$$

where $\Lambda_k(f)$ is the Fourier transform of $\lambda_k(\tau)$ centered at zero frequency. When sampled at or above the Nyquist rate (twice the bandwidth of $\Lambda_k(f)$), $\lambda_k(n\tau_s)$ contains sufficient information to reconstruct the continuous time signal $\lambda_k(t)$, and thus also its frequency-offset version $e^{j2\pi f_k \tau}\lambda_k(\tau)$. Therefore, the composite correlation output $\lambda(\tau)$ can be reconstructed fully and sampled at any desired rate if $\lambda_k(\tau)$ is sampled at or above Nyquist rate for all sub-carriers.

Furthermore, in order to reduce computational complexity, $\lambda_k(\tau)$ is usually sampled at the Nyquist rate. Thus, equation (24) will not meet the Nyquist criterion since $\lambda(\tau)$ has K times the bandwidth of the individual spectrum for a system with K sub-carriers. To satisfy the Nyquist criterion, $\lambda(\tau)$ must be sampled at or above the rate of $$\frac{K}{\tau_s}.$$

The following explains how to synthesize $\lambda(\tau)$ at the desired sampling rate using Discrete Fourier Transform (DFT) from $\lambda_k(\tau)$'s, which are sampled at or above the Nyquist rate. The sampling may be done, for example, at two samples per chip or greater.

Figure 6:
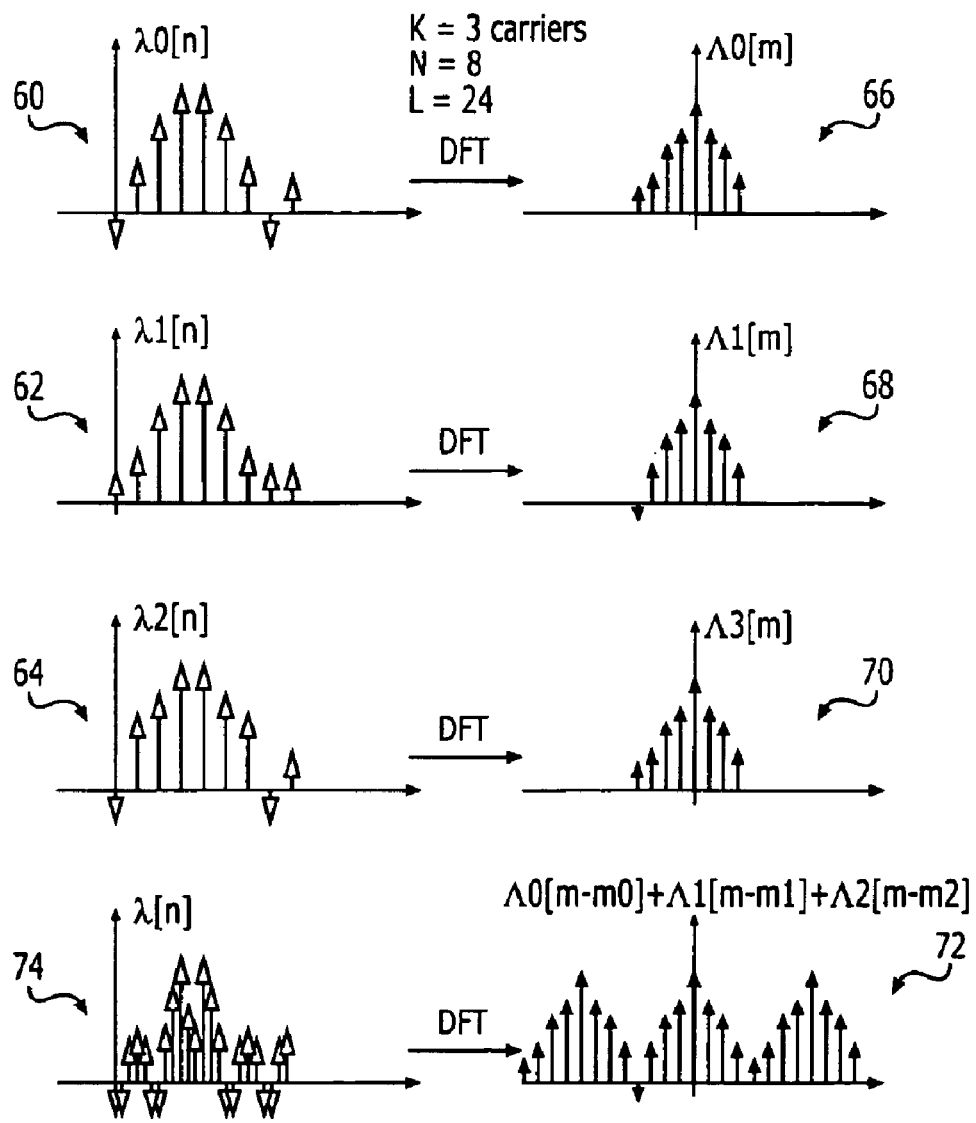
FIG. 6 is a set of graphs illustrating a method of synthesizing a radio channel profile in accordance with the invention.

This aspect of the invention is explained by an example as shown in FIG. 6. This example relates to the receiver architecture of FIG. 5. Let $$\lambda_k[n]=\lambda_k(n\tau_s), \text{ for } n=0, 1, \ldots, N-1 \quad (26)$$

denote the discrete samples over a period of $N\tau_s$ of the individual correlation output sampled at the rate of $1/\tau_s$ Hz, which is assumed to meet the Nyquist criterion. Graphs 60, 62 and 64 represent the individual correlation outputs for respective first, second and third sub-carriers in a three carrier system. The composite correlation output $\lambda(\tau)$ sampled at the rate of $$\frac{L}{N\tau_s}$$

Hz can be obtained for the same observation period by the following procedure:

1. For each sub-carrier k=0, 1, ..., K−1, compute the DFT of length N, denoted by $F_N\{\cdot\}$, for $\lambda_k[n]$:

$$\Lambda_k[m] \triangleq F_N\{\lambda_k[n]\} = \sum_{n=0}^{N-1} \lambda_k[n] e^{-\frac{j2\pi mn}{N}} \quad (27)$$

over the frequency range of m=−N/2, −N/2+1, . . . 0, 1, N/2−1. The results are represented by graphs 66, 68 and 70.

2. Compute $m_k$, the carrier frequency offset $f_k$ in discrete domain, for each sub-carrier:

$$m_k = f_k N \tau_s. \quad (28)$$

3. Form the discrete Fourier transform of $\lambda(\tau)$ by summing all the individual DFT spectra, shown in graphs 66, 68 and 70, shifted by the appropriate frequency offset:

$$\Lambda[m] = \sum_{k=0}^{K-1} \Lambda_k[m - m_k] \quad (29)$$

for m=−L/2, −L/2+1, . . . , 0, 1, . . . , L/2−1. Zeroes are added if necessary to give a total of L samples. The resultant transform is represented by the graph 72.

4. Calculate the inverse DFT of length L for $\Lambda[m]$:

$$\lambda[n] \triangleq F_L^{-1}\{\Lambda[m]\} = \sum_{m=-L/2}^{L/2-1} \Lambda[m] e^{\frac{j2\pi mn}{L}}. \quad (30)$$

The resulting time domain sequence $\lambda[n]$, represented by the graph 74, is the composite correlation output sampled at the desired rate.

As is apparent, the resulting time domain sequence has a higher resolution profile illustrated by the graph 74 having two peaks at substantially higher correlation amounts compared to the individual correlation output curves 60, 62 and 64.

Figure 7:
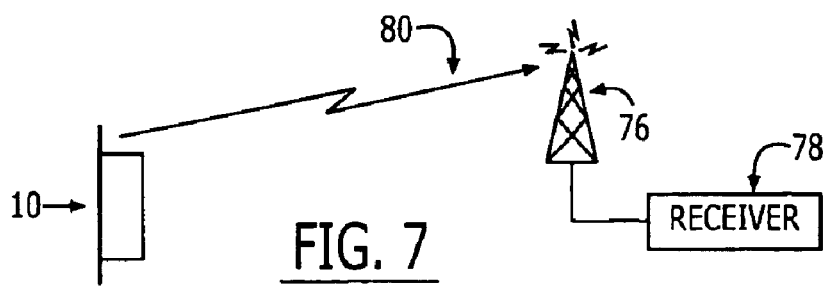
FIG. 7 is a block diagram of a mobile communication system including a receiver according to the invention.

The receiver embodiments discussed above relate to the mobile terminal 10. As is apparent similar receiver embodiments could be used in a receiver 76 of a base station 78, as shown in FIG. 7. The base station 78 communicates with the mobile terminal 10 via a mobile communication network, represented at 80. The receiver 76 would be used in applications where the mobile terminal 10 transmits a multi-carrier signal.

We claim:

1. A receiver for a multi-carrier CDMA system for receiving a signal transmitted on plural sub-carriers each having a known pilot sequence, comprising:
   a plurality of down-converters down-converting the received signal to different data baseband signals;
   a delay and channel estimator correlating at least one of the different data baseband signals with a single wideband pilot signal, the single wideband pilot signal comprising more than one of the known pilot sequences, to produce an estimate of channel gain and multi-path delay; and
   a plurality of demodulators, one for each of the plural sub-carriers, and operatively coupled to the delay and channel estimator, each demodulating one of the different data baseband signals using the estimate of channel gain and multi-path delay.

2. The receiver of claim 1 wherein the plurality of down-converters comprise one for each sub-carrier.

3. The receiver of claim 1 wherein the plurality of down-converters comprise a plurality of sub-carrier down-converters, one for each sub-carrier, and a composite down-converter down-converting the received signal to a composite baseband signal.

4. The receiver of claim 3 wherein the delay and channel estimator is operatively coupled to the composite down converter for correlating the composite baseband signal, with a composite of the known pilot sequence to produce an estimate of channel gain and multi-path delay.

5. The receiver of claim 1 wherein the delay and channel estimator comprises a plurality of correlators, one for each sub-carrier, and outputs of each of the plurality of correlators are combined to produce the estimate of channel gain and multi-path delay.

6. The receiver of claim 1 further comprising a plurality of correlators, one for each down-converter, each correlating one of the baseband signals with the known pilot sequence for one of the sub-carriers, to produce an estimate of channel gain and multi-path delay, and wherein the plurality of demodulators selectively demodulate the different data baseband signals using either the estimate of channel gain and multi-path delay produced by the delay and channel estimator or the estimate of channel gain and multi-path delay produced by the plurality of correlators.

7. A receiver for a multi-carrier CDMA system for receiving a signal transmitted having a known pilot sequence on plural sub-carriers, comprising:
 a plurality of sub-carrier down-converters and filters, one for each sub-carrier, each down-converting the received signal to baseband and removing the other sub-carriers to provide different data sub-carrier baseband signals;
 a composite down-converter down-converting the received signal to a composite baseband signal;
 a delay and channel estimator operatively coupled to the composite down converter correlating the composite baseband signal with a composite of the known pilot sequence to produce an estimate of channel gain and multi-path delay; and
 a plurality of demodulators, each operatively connected to one of the sub-carrier down-converters and filters and to the delay and channel estimator, each demodulating one of the different data sub-carrier baseband signals using the estimate of channel gain and multi-path delay.

8. The receiver of claim 7 wherein the composite down converter down-converts the received signal relative to a center carrier frequency and the sub-carriers are separated with respect to the center carrier frequency.

9. The receiver of claim 8 wherein the composite of the known pilot sequence comprises a sum of the known pilot sequences.

10. The receiver of claim 7 further comprising a plurality of correlators, one for each down-converter, each correlating one of the different data sub-carrier baseband signals with the known pilot sequence for one of the sub-carriers, to produce an estimate of channel gain and multi-path delay, and wherein the plurality of demodulators selectively demodulate the different data sub-carrier baseband signals using either the estimate of channel gain and multi-path delay produced by the delay and channel estimator or the estimate of channel gain and multi-path delay produced by the plurality of correlators.

11. A receiver for a multi-carrier CDMA system for receiving a signal transmitted on plural sub-carriers each having a known pilot sequence, comprising:
 a plurality of sub-carrier down-converters and filters, one for each sub-carrier, each down-converting the received signal to baseband and removing the other sub-carriers to provide different data sub-carrier baseband signals;
 a delay and channel estimator comprising a plurality of correlators, each correlating one of the different data sub-carrier baseband signals with the known pilot sequence for the one sub-carrier, and operative to combine outputs of the plurality of correlators to produce an estimate of channel gain and multi-path delay; and
 a plurality of demodulators, one for each of the plural sub-carriers and operatively coupled to the delay and channel estimator, each demodulating one of the different data baseband signals using the estimate of channel gain and multi-path delay.

12. The receiver of claim 11 wherein the delay and channel estimator identifies multi-paths and relative delays for the multi-paths using threshold comparison.

13. A method of synthesizing a radio channel profile for a multi-carrier CDMA receiver receiving a signal transmitted on plural sub-carriers, comprising:
 down-converting the received signal to baseband and removing the other sub-carriers to provide different data sub-carrier baseband signals;
 correlating each of the different data sub-carrier baseband signals with a known pilot sequence to provide correlated different data sub-carrier baseband signals;
 sampling each of the correlated different data sub-carrier baseband signals;
 transforming each of the sampled, correlated different data sub-carrier baseband signals to a discrete frequency domain;
 combining the transformed baseband signals to produce a combined discrete frequency domain signal; and
 inverse transforming the combined discrete frequency domain signal to produce a composite correlation output signal.

14. The method of claim 13 wherein sampling each of the different data correlated sub-carrier baseband signals comprises sampling each of the correlated sub-carrier baseband signals at Nyquist rate.

15. The method of claim 13 wherein sampling each of the different data correlated sub-carrier baseband signals comprises sampling each of the different data correlated sub-carrier baseband signals at greater than. Nyquist rate.

16. The method of claim 13 wherein transforming each of the sampled, different data correlated sub-carrier baseband signals to a discrete frequency domain comprises forming discrete Fourier transforms for each of the sampled, different data correlated sub-carrier baseband signals.

17. The method of claim 13 wherein combining the transformed baseband signals to produce a combined discrete frequency domain signal comprises computing a carrier frequency offset in frequency domain for each of the sub-carriers and summing the transformed baseband signals using the carrier frequency offsets in the frequency domain.

18. The method of claim 16 wherein inverse transforming the combined discrete frequency domain signal to produce a composite correlation output signal comprises calculating an inverse discrete Fourier transform for the combined discrete frequency domain signal.

19. A mobile terminal for a multi-carrier CDMA system comprising:
 a receiver for receiving a signal transmitted on plural sub-carriers each having a known pilot sequence comprising a plurality of down-converters down-converting the received signal to different data baseband signals, a delay and channel estimator correlating at least one of the different data baseband signals with a single wideband pilot signal, the single wideband pilot signal comprising more than one of the known pilot sequences, to produce an estimate of channel gain and multi-path delay, and a plurality of demodulators, one for each of the plural sub-carriers, and operatively coupled to the delay and channel estimator, each demodulating one of the different data baseband signals using the estimate of channel gain and multi-path delay.

20. The mobile terminal of claim 19 wherein the plurality of down-converters comprise one for each sub-carrier.

21. The mobile terminal of claim 19 wherein the plurality of down-converters comprise a plurality of sub-carrier down-converters, one for each sub-carrier, and a composite down-converter down-converting the received signal to a composite baseband signal.

22. The mobile terminal of claim 21 wherein the delay and channel estimator is operatively coupled to the composite down converter for correlating the composite baseband signal with a composite of the known pilot sequence to produce an estimate of channel gain and multi-path delay.

23. The mobile terminal of claim 19 wherein the delay and channel estimator comprises a plurality of correlators, one for each sub-carrier, and outputs of each of the plurality of correlators are combined to produce the estimate of channel gain and multi-path delay.

24. The mobile terminal of claim 19 further comprising a plurality of correlators, one for each down-converter, each correlating one of the different data baseband signals with the known pilot sequence for one of the sub-carriers, to produce an estimate of channel gain and multi-path delay, and wherein the plurality of demodulators selectively demodulate the different data baseband signals using either the estimate of channel gain and multi-path delay produced by the delay and channel estimator or the estimate of channel gain and multi-path delay produced by the plurality of correlators.

25. A base station for a multi-carrier CDMA system comprising:
a receiver for receiving a signal transmitted on plural sub-carriers each having a known pilot sequence comprising a plurality of down-converters down-converting the received signal to different data baseband signals, a delay and channel estimator correlating at least one of the different data baseband signals with a single wideband pilot signal, the single wideband pilot signal comprising more than one of the known pilot sequences, to produce an estimate of channel gain and multi-path delay, and a plurality of demodulators, one for each of the plural sub-carriers, and operatively coupled to the delay and channel estimator, each demodulating one of the different data baseband signals using the estimate of channel gain and multi-path delay.

26. The base station of claim 25 wherein the plurality of down-converters comprise one for each sub-carrier.

27. The base station of claim 25 wherein the plurality of down-converters comprise a plurality of sub-carrier down-converters, one for each sub-carrier, and a composite down-converter down-converting the received signal to a composite baseband signal.

28. The base station of claim 27 wherein the delay and channel estimator is operatively coupled to the composite down converter for correlating the composite baseband signal with a composite of the known pilot sequence to produce an estimate of channel gain and multi-path delay.

29. The base station of claim 25 wherein the delay and channel estimator comprises a plurality of correlators, one for each sub-carrier, and outputs of each of the plurality of correlators are combined to produce the estimate of channel gain and multi-path delay.

30. The base station of claim 25 further comprising a plurality of correlators, one for each down-converter, each correlating one of the different data baseband signals with the known pilot sequence for one of the sub-carriers, to produce an estimate of channel gain and multi-path delay, and wherein the plurality of demodulators selectively demodulate the different data baseband signals using either the estimate of channel gain and multi-path delay produced by the delay and channel estimator or the estimate of channel gain and multi-path delay produced by the plurality of correlators.

31. A method of synthesizing a radio channel profile for a multi-carrier CDMA receiver receiving a signal transmitted on plural sub-carriers, comprising:
down-converting the received signal to baseband and removing the other sub-carriers to provide different data sub-carrier baseband signals;
correlating each of the different data sub-carrier baseband signals with a known pilot sequence to provide correlated different data sub-carrier baseband signals;
sampling each of the correlated different data sub-carrier baseband signals; and
combining the correlated different data sub-carrier baseband signals to produce a combined signal.

* * * * *

UNITED STATES PATENT AND TRADEMARK OFFICE
CERTIFICATE OF CORRECTION

PATENT NO. : 6,876,645 B1  
DATED : April 5, 2005  
INVENTOR(S) : Guey et al.

It is certified that error appears in the above-identified patent and that said Letters Patent is hereby corrected as shown below:

Column 12,
Line 31, should read -- carrier baseband signals at greater than Nyquist rate. --.

Signed and Sealed this

Sixteenth Day of August, 2005

JON W. DUDAS
*Director of the United States Patent and Trademark Office*